(12) United States Patent
Glasco

(10) Patent No.: US 11,665,108 B2
(45) Date of Patent: *May 30, 2023

(54) QOS MANAGER FOR SYSTEM ON A CHIP COMMUNICATIONS

(71) Applicant: Tesla, Inc., Austin, TX (US)

(72) Inventor: David Glasco, Austin, TX (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,489

(22) Filed: Dec. 3, 2021

(65) Prior Publication Data

US 2022/0166726 A1 May 26, 2022

Related U.S. Application Data

(63) Continuation of application No. 16/663,229, filed on Oct. 24, 2019, now Pat. No. 11,196,678.

(Continued)

(51) Int. Cl.
*H04L 47/80* (2022.01)
*H04L 47/78* (2022.01)
(Continued)

(52) U.S. Cl.
CPC ............ *H04L 47/805* (2013.01); *G06F 9/542* (2013.01); *G06F 9/546* (2013.01);
(Continued)

(58) Field of Classification Search
CPC .. G06F 15/7807; G06F 3/061; G06F 13/1621; H04L 41/5003; H04L 41/5019; H04L 49/9005
See application file for complete search history.

(56) References Cited

U.S. PATENT DOCUMENTS

| | | | |
|---|---|---|---|
| 6,845,100 B1 * | 1/2005 | Rinne | H04W 8/04 370/395.43 |
| 6,882,755 B2 | 5/2005 | Silverstein et al. | |

(Continued)

FOREIGN PATENT DOCUMENTS

| | | |
|---|---|---|
| AU | 2019261735 A1 | 6/2020 |
| AU | 2019201716 A1 | 10/2020 |

(Continued)

*Primary Examiner* — Mahran Y Abu Roumi
(74) *Attorney, Agent, or Firm* — Knobbe, Martens, Olson & Bear, LLP

(57) ABSTRACT

An example SoC includes a plurality of processing systems supporting respective Quality of Service (QoS) rules, channel circuitry that is configured to service communications for the plurality of processing systems and that includes a QoS manager. The QoS manager determines that a first processing system of the plurality of processing systems that operates according to first QoS rules desires to send a communication with a first QoS selection of the first QoS rules to a second processing system that operates according to second QoS rules, determines available communication receipt resources of the second processing system of the plurality of processing systems, the second processing system supporting second QoS rules, determines a communication resources allocation for the second processing system based upon the first QoS rules, the second QoS rules, and the first QoS selection, and directs the second processing system to operate according to the communication resource allocation.

18 Claims, 10 Drawing Sheets

Related U.S. Application Data

(60) Provisional application No. 62/750,297, filed on Oct. 25, 2018.

(51) Int. Cl.
  *H04L 47/70* (2022.01)
  *G06F 9/54* (2006.01)
  *G06F 15/78* (2006.01)
  *H04L 43/0817* (2022.01)

(52) U.S. Cl.
  CPC ...... *G06F 15/7807* (2013.01); *H04L 43/0817* (2013.01); *H04L 47/781* (2013.01); *H04L 47/822* (2013.01)

(56) References Cited

U.S. PATENT DOCUMENTS

| | | |
|---|---|---|
| 7,209,031 B2 | 4/2007 | Nakai et al. |
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,909,220 B1 * | 12/2014 | Aftahi .................. H04B 7/02 455/430 |
| 8,912,476 B2 | 12/2014 | Fogg et al. |
| 8,913,830 B2 | 12/2014 | Sun et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |

(56) References Cited

U.S. PATENT DOCUMENTS

| | | |
|---|---|---|
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,196,678 B2 | 12/2021 | Glasco |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0002692 A1 | 1/2010 | Bims |
| 2010/0118157 A1 | 5/2010 | Kameyama |
| 2012/0076103 A1* | 3/2012 | Dai ................ H04L 1/00 370/329 |
| 2012/0109915 A1 | 5/2012 | Kamekawa |
| 2012/0110491 A1 | 5/2012 | Cheung |
| 2012/0134595 A1 | 5/2012 | Fonseca et al. |
| 2012/0213070 A1* | 8/2012 | Lee ................ H04L 41/5003 370/231 |
| 2012/0246368 A1* | 9/2012 | Kwon ................ G06F 13/4022 710/110 |
| 2014/0208071 A1 | 7/2014 | Jeong |
| 2015/0104102 A1 | 4/2015 | Carreira et al. |
| 2015/0281109 A1 | 10/2015 | Saxena |
| 2016/0132786 A1 | 5/2016 | Balan et al. |
| 2016/0196231 A1* | 7/2016 | Quach ................ G06F 11/3433 710/307 |
| 2016/0328856 A1 | 11/2016 | Mannino et al. |
| 2017/0011281 A1 | 1/2017 | Dihkman et al. |
| 2017/0158134 A1 | 6/2017 | Shigemura |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0150393 A1* | 5/2018 | Kim ................ G06F 3/0683 |
| 2018/0189097 A1* | 7/2018 | Bruce ................ G06F 9/467 |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |

(56) References Cited

U.S. PATENT DOCUMENTS

| | | |
|---|---|---|
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0050252 A1* | 2/2019 | Arbel ............... G06F 3/064 |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |

(56) References Cited

U.S. PATENT DOCUMENTS

| | | |
|---|---|---|
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |

(56) References Cited

U.S. PATENT DOCUMENTS

| | | | |
|---|---|---|---|
| 2021/0056306 A1 | 2/2021 | Hu et al. | |
| 2021/0056317 A1 | 2/2021 | Golov | |
| 2021/0056420 A1 | 2/2021 | Konishi et al. | |
| 2021/0056701 A1 | 2/2021 | Vranceanu et al. | |

FOREIGN PATENT DOCUMENTS

| | | | |
|---|---|---|---|
| CN | 110599537 A | 12/2010 | |
| CN | 102737236 A | 10/2012 | |
| CN | 103366339 A | 10/2013 | |
| CN | 104835114 A | 8/2015 | |
| CN | 103236037 B | 5/2016 | |
| CN | 103500322 B | 8/2016 | |
| CN | 106419893 A | 2/2017 | |
| CN | 106504253 A | 3/2017 | |
| CN | 107031600 A | 8/2017 | |
| CN | 107169421 A | 9/2017 | |
| CN | 107507134 A | 12/2017 | |
| CN | 107885214 A | 4/2018 | |
| CN | 108122234 A | 6/2018 | |
| CN | 107133943 B | 7/2018 | |
| CN | 107368926 B | 7/2018 | |
| CN | 105318888 B | 8/2018 | |
| CN | 108491889 A | 9/2018 | |
| CN | 108647591 A | 10/2018 | |
| CN | 108710865 A | 10/2018 | |
| CN | 105550701 B | 11/2018 | |
| CN | 108764185 A | 11/2018 | |
| CN | 108845574 A | 11/2018 | |
| CN | 108898177 A | 11/2018 | |
| CN | 109086867 A | 12/2018 | |
| CN | 107103113 B | 1/2019 | |
| CN | 109215067 A | 1/2019 | |
| CN | 109359731 A | 2/2019 | |
| CN | 109389207 A | 2/2019 | |
| CN | 109389552 A | 2/2019 | |
| CN | 106779060 B | 3/2019 | |
| CN | 109579856 A | 4/2019 | |
| CN | 109615073 A | 4/2019 | |
| CN | 106156754 B | 5/2019 | |
| CN | 106598226 B | 5/2019 | |
| CN | 106650922 B | 5/2019 | |
| CN | 109791626 A | 5/2019 | |
| CN | 109901595 A | 6/2019 | |
| CN | 109902732 A | 6/2019 | |
| CN | 109934163 A | 6/2019 | |
| CN | 109948428 A | 6/2019 | |
| CN | 109949257 A | 6/2019 | |
| CN | 109951710 A | 6/2019 | |
| CN | 109975308 A | 7/2019 | |
| CN | 109978132 A | 7/2019 | |
| CN | 109978161 A | 7/2019 | |
| CN | 110060202 A | 7/2019 | |
| CN | 110069071 A | 7/2019 | |
| CN | 110084086 A | 8/2019 | |
| CN | 110096937 A | 8/2019 | |
| CN | 110111340 A | 8/2019 | |
| CN | 110135485 A | 8/2019 | |
| CN | 110197270 B | 9/2019 | |
| CN | 110310264 A | 10/2019 | |
| CN | 110321965 A | 10/2019 | |
| CN | 110334801 A | 10/2019 | |
| CN | 110399875 A | 11/2019 | |
| CN | 110414362 A | 11/2019 | |
| CN | 110426051 A | 11/2019 | |
| CN | 110473173 A | 11/2019 | |
| CN | 110516665 A | 11/2019 | |
| CN | 110543837 A | 12/2019 | |
| CN | 110569899 A | 12/2019 | |
| CN | 110599864 A | 12/2019 | |
| CN | 110619282 A | 12/2019 | |
| CN | 110619283 A | 12/2019 | |
| CN | 110619330 A | 12/2019 | |
| CN | 110659628 A | 1/2020 | |
| CN | 110688992 A | 1/2020 | |
| CN | 107742311 B | 2/2020 | |
| CN | 110751280 A | 2/2020 | |
| CN | 110826566 A | 2/2020 | |
| CN | 107451659 B | 4/2020 | |
| CN | 108111873 B | 4/2020 | |
| CN | 110956185 A | 4/2020 | |
| CN | 110966991 A | 4/2020 | |
| CN | 111027549 A | 4/2020 | |
| CN | 111027575 A | 4/2020 | |
| CN | 111047225 A | 4/2020 | |
| CN | 111126453 A | 5/2020 | |
| CN | 111158355 A | 5/2020 | |
| CN | 107729998 B | 6/2020 | |
| CN | 108549934 B | 6/2020 | |
| CN | 111275129 A | 6/2020 | |
| CN | 111275618 A | 6/2020 | |
| CN | 111326023 A | 6/2020 | |
| CN | 111428943 A | 7/2020 | |
| CN | 111444821 A | 7/2020 | |
| CN | 111445420 A | 7/2020 | |
| CN | 111461052 A | 7/2020 | |
| CN | 111461053 A | 7/2020 | |
| CN | 111461110 A | 7/2020 | |
| CN | 110225341 B | 8/2020 | |
| CN | 111307162 B | 8/2020 | |
| CN | 111488770 A | 8/2020 | |
| CN | 111539514 A | 8/2020 | |
| CN | 111565318 A | 8/2020 | |
| CN | 111582216 A | 8/2020 | |
| CN | 111598095 A | 8/2020 | |
| CN | 108229526 B | 9/2020 | |
| CN | 111693972 A | 9/2020 | |
| CN | 106558058 B | 10/2020 | |
| CN | 107169560 B | 10/2020 | |
| CN | 107622258 B | 10/2020 | |
| CN | 111767801 A | 10/2020 | |
| CN | 111768002 A | 10/2020 | |
| CN | 111783545 A | 10/2020 | |
| CN | 111783971 A | 10/2020 | |
| CN | 111797657 A | 10/2020 | |
| CN | 111814623 A | 10/2020 | |
| CN | 111814902 A | 10/2020 | |
| CN | 111860499 A | 10/2020 | |
| CN | 111881856 A | 11/2020 | |
| CN | 111882579 A | 11/2020 | |
| CN | 111897639 A | 11/2020 | |
| CN | 111898507 A | 11/2020 | |
| CN | 111898523 A | 11/2020 | |
| CN | 111899227 A | 11/2020 | |
| CN | 112101175 A | 12/2020 | |
| CN | 112101562 A | 12/2020 | |
| CN | 112115953 A | 12/2020 | |
| CN | 111062973 B | 1/2021 | |
| CN | 111275080 B | 1/2021 | |
| CN | 112183739 A | 1/2021 | |
| CN | 112232497 A | 1/2021 | |
| CN | 112288658 A | 1/2021 | |
| CN | 112308095 A | 2/2021 | |
| CN | 112308799 A | 2/2021 | |
| CN | 112313663 A | 2/2021 | |
| CN | 112329552 A | 2/2021 | |
| CN | 112348783 A | 2/2021 | |
| CN | 111899245 B | 3/2021 | |
| DE | 202017102235 U1 | 5/2017 | |
| DE | 202017102238 U1 | 5/2017 | |
| DE | 102017116017 A1 | 1/2019 | |
| DE | 102018130821 A1 | 6/2020 | |
| DE | 102019008316 A1 | 8/2020 | |
| EP | 1215626 B1 | 9/2008 | |
| EP | 2228666 B1 | 9/2012 | |
| EP | 2420408 B1 | 5/2013 | |
| EP | 2723069 A1 | 4/2014 | |
| EP | 2741253 A1 | 6/2014 | |
| EP | 3115772 A1 | 1/2017 | |
| EP | 2618559 B1 | 8/2017 | |
| EP | 3285485 A1 | 2/2018 | |
| EP | 2863633 B1 | 2/2019 | |
| EP | 3113080 B1 | 5/2019 | |
| EP | 3525132 A1 | 8/2019 | |

(56) References Cited

FOREIGN PATENT DOCUMENTS

| | | | |
|---|---|---|---|
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2015004922 A | 1/2015 |
| JP | 5863536 B2 | 2/2016 |
| JP | 6044134 B2 | 12/2016 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

\* cited by examiner

QOS MANAGER FOR SYSTEM ON A CHIP COMMUNICATIONS

CROSS-REFERENCE TO RELATED APPLICATIONS

This application is a continuation of U.S. application Ser. No. 16/663,229, which was filed Oct. 24, 2019 and which is entitled, "QOS MANAGER FOR SYSTEM ON A CHIP COMMUNICATIONS," which claims priority to U.S. Provisional App. No. 62/750,297, which was filed on Oct. 25, 2018 and which is entitled, "QOS MANAGER FOR SYSTEM ON A CHIP COMMUNICATIONS," the contents of which are hereby incorporated herein by reference in its entirety.

Any and all applications for which a foreign or domestic priority claim is identified in the Application Data Sheet as filed with the present application are hereby incorporated by reference in their entirety under 37 CFR 1.57.

BACKGROUND

Technical Field

The present disclosure relates to a System on a Chip (SoC) that includes a plurality of separate processing systems and more particularly to the management of communications between the plurality of separate processing systems of the SoC.

Description of Related Art

FIG. 1 is a block diagram illustrating a prior art SoC 100 that includes a plurality of processing systems 102A-102L arranged on a single integrated circuit. Each of the processing systems 102A-102L performs corresponding processing functions. A channel is located among and between the plurality of processing systems 102A-102L. Channel circuitry 104 contained in the channel services data transfers between the plurality of processing systems 102A-102L and also may perform additional processing functions.

The channel circuitry 104 services communications between the plurality of processing systems 102A-102L. The plurality of processing systems 102A-102L typically each has native Quality of Service (QoS) rules for external communications so that at least some of the processing systems have differing QoS rules. For example, one of the processing systems, e.g., processing system 102D, may have two QoS levels while another of the processing systems, e.g., processing system 102F may have three QoS levels. Typically, a processing system has resources, e.g., input buffers and output buffers, allocated to differing QoS levels. Thus, QoS level disparity that exists between differing processing systems causes a mismatch between resources in one processing system as compared to resources in another processing system. This mismatch may result in communication delays, lost data, and can cause the SoC 100 to perform at a reduced efficiency.

SUMMARY

Example embodiments of the present disclosure are directed towards a System on a Chip (SoC). An example SoC includes a plurality of processing systems, each processing system of the plurality of processing systems having at least one communication interface supporting respective Quality of Service (QoS) rules. The SOC further includes channel circuitry coupled to and residing among the plurality of processing systems, the channel circuitry including communication circuitry configured to service communications for the plurality of processing systems; and a QoS manager. The QoS manager is configured to determine that a first processing system of the plurality of processing systems that operates according to first QoS rules desires to send a communication with a first QoS selection of the first QoS rules to a second processing system that operates according to second QoS rules; determine available communication receipt resources of the second processing system of the plurality of processing systems, the second processing system supporting second QoS rules; determine a communication resources allocation for the second processing system based upon the first QoS rules, the second QoS rules, and the first QoS selection; and direct the second processing system to operate according to the communication resource allocation to receive the communication from the first processing system.

Another example SoC includes a plurality of processing systems, each processing system of the plurality of processing systems having at least one communication interface supporting respective Quality of Service (QoS) rules; and channel circuitry coupled to and residing among the plurality of processing systems. The channel circuitry includes communication circuitry configured to service communications for the plurality of processing systems; and a QoS manager. The QoS manager is configured to monitor available communication receipt resources of a second processing system of the plurality of processing systems, the second processing system supporting second QoS rules; determine that a first processing system of the plurality of processing systems that operates according to first QoS rules desires to send a communication with a first QoS selection of the first QoS rules; determine a communication resources allocation for the second processing system based upon the available communication receipt resources, the first QoS selection, the first QoS rules, and the second QoS rules; and direct the first processing system to transmit the communication to the second processing system according to the communication resources allocation.

Embodiments of the present disclosure are directed to methods for operating a SoC which includes a plurality of processing systems and a Quality of Service (QoS) manager. An example method includes the QoS manager determining that a first processing system of the plurality of processing systems that operates according to first QoS rules desires to send a communication with a first QoS selection of the first QoS rules to a second processing system that operates according to second QoS rules; the QoS manager determining available communication receipt resources of the second processing system of the plurality of processing systems, the second processing system supporting second QoS rules; the QoS manager determining a communication resources allocation for the second processing system based upon the first QoS rules, the second QoS rules, and the first QoS selection; and the QoS manager directing the second processing system to operate according to the communication resource allocation to receive the communication from the first processing system.

Another example method includes the QoS manager monitoring available communication receipt resources of a second processing system of the plurality of processing systems, the second processing system supporting second QoS rules; the QoS manager determining that a first processing system of the plurality of processing systems that operates according to first QoS rules desires to send a communication with a first QoS selection of the first QoS rules; the QoS manager determining a communication resources allocation for the second processing system based upon the available communication receipt resources, the first QoS selection, the first QoS rules, and the second QoS rules; and the QoS manager directing the first processing system to transmit the communication to the second processing system according to the communication resources allocation.

DETAILED DESCRIPTION

This specification describes techniques to manage different quality of service (QoS) rules. For example, a system on a chip (SoC) may include a multitude of processing systems or elements. As described above, these processing systems may be associated with different QoS rules. It may be appreciated that a QoS rule may inform use of one or more buffers associated with a processing system or element. For example, a processing system or element may have different buffers allocated to differing QoS levels. Example buffers may at least include a receive buffer and a transmit buffer. A QoS rule may inform selection of a QoS level, such that a buffer, or a portion thereof, may be allocated based on the selection. Being able to include processing systems or elements on a same SoC introduces technological benefits.

As will be described below, a QoS manager can allow adjustment of buffers (e.g., transmit buffers, receive buffers, and so on) used by different processing systems or elements included in one or more SoCs. For example, the QoS manager can obtain information identifying that a first processing system is to transmit information to a second processing system. The first processing system may use first QoS rules, and the communication may be associated with a particular selection of the first QoS rules. As described above, this selection may inform allocation of a buffer. The second processing system may use second QoS rules, which may be different from that of the first QoS rules.

Advantageously, the QoS manager may determine a communication resource allocation for the second processing system. For example, the communication resource allocation may adjust a receive buffer of the second processing system. In this example, the adjustment may conform the receive buffer to the selection of the first QoS rules. As an example, the receive buffer of the second processing system may be subdivided according to the first QoS rules. An example of adjusting a receive buffer is described below, with respect to FIG. 8.

The QoS manager may therefore allow for management (e.g., translation and/or negotiation) of different QoS rules. In this way, different processing systems or elements may be rapidly included in a SoC. Complexities associated with managing different QoS rules may, as an example, be masked from an end-user or designer of the SoC.

Figure 1:
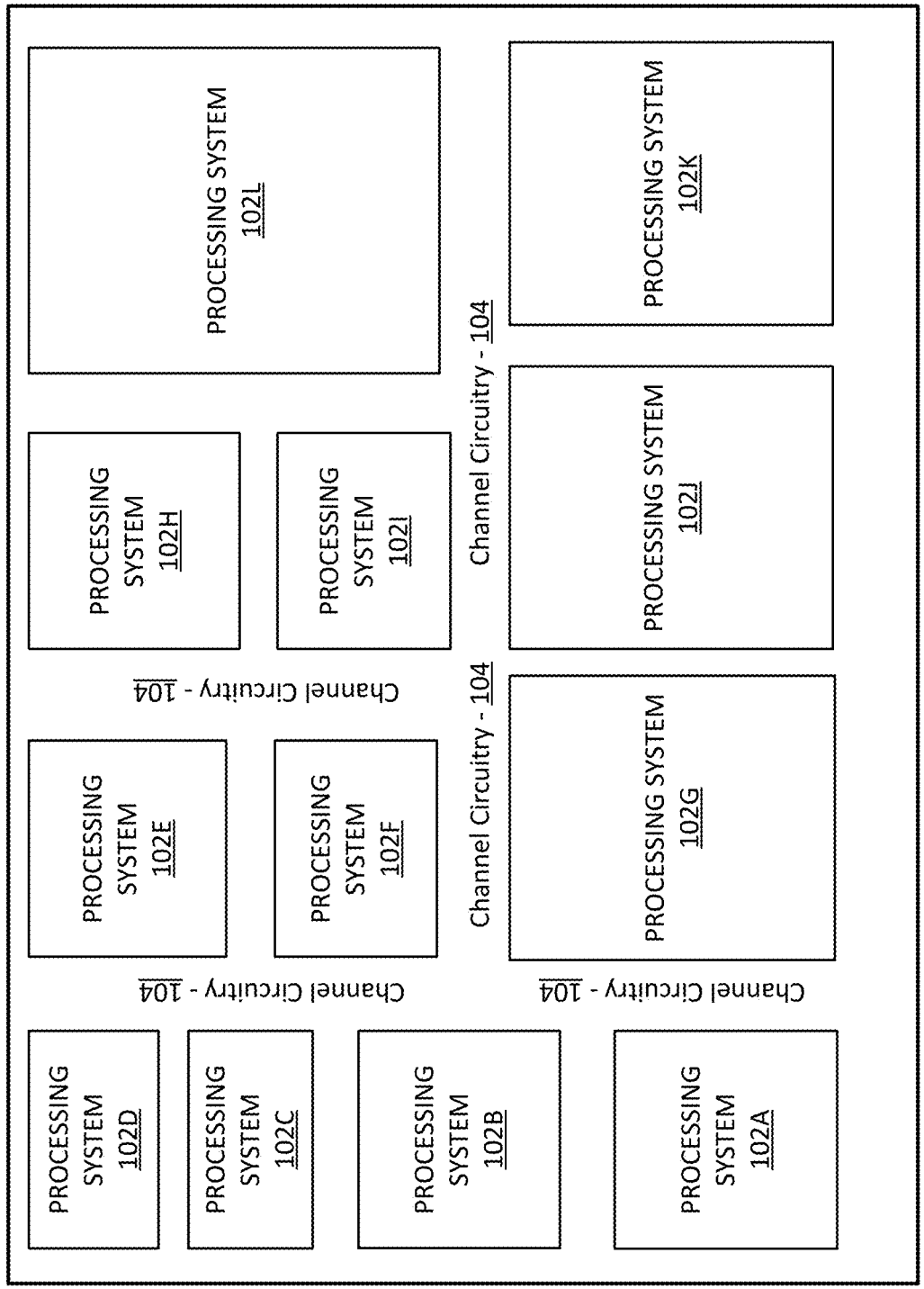
FIG. 1 is a block diagram illustrating a prior art System on a Chip (SoC).
Figure 2:
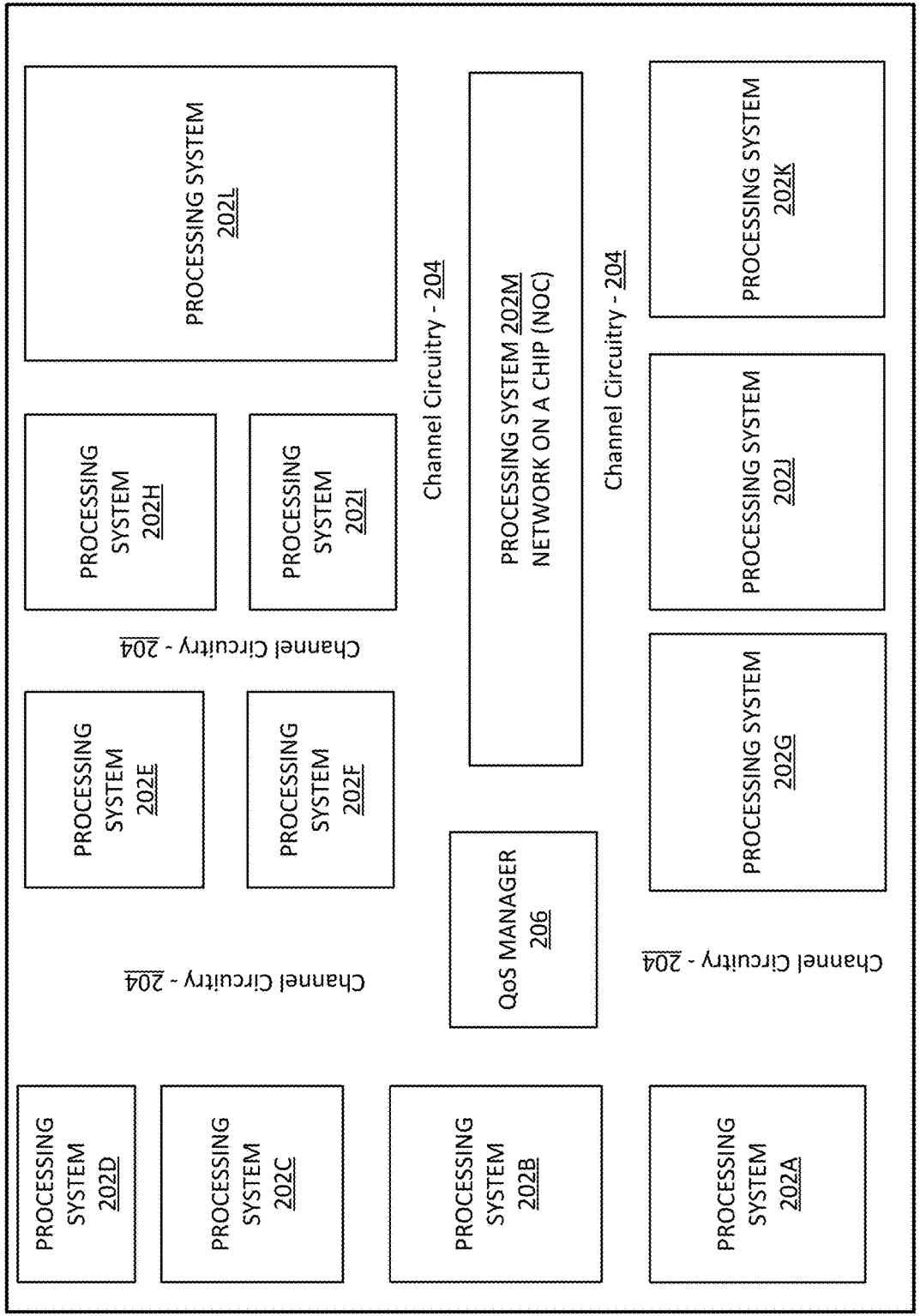
FIG. 2 is a block diagram illustrating a SoC constructed according to an embodiment of the present disclosure.

FIG. 2 is a block diagram illustrating a SoC 200 constructed and operating according to an embodiment of the present disclosure. The SoC 200 includes a plurality of processing systems 202A, 202B, 202C, 202D, 202E, 202F, 202G, 202H, 202I, 202J, 202K, and 202L. These processing systems 202A-202L perform respective functions and have respective structures, e.g., general processor, communications processor (cellular, WiFi, Bluetooth, etc.), network interface processor, image processor, audio processor, graphics processor, arithmetic unit processor, security processor, safety processor, and human interaction processor, memory controller, and computer bus interface processors, among other processing structures. SoCs are often smaller, less expensive, and consume less power than devices that include separate processing systems. Multiple SoCs may be packaged into a multi-chip module to further increase processing capacity. The SoC of FIG. 2 may serve in various systems, e.g., vehicular autonomous driving systems, data center processing systems, data center storage systems, and a great number of other systems.

The plurality of processing systems 202A-202L may be designed by one or more third parties and licensed for use in the SoC 200. In such case, the functionality of these processing systems 202A-202L and their structures may not be alterable in the construction or manufacture of the SoC 200. The processing systems 202A-202L may have unique and differing QoS rules and have unique allocations of communication resources, e.g., input buffers, output buffers, packet processing operations, etc. to service differing Quality of Service (QoS) levels. In such case, the QoS rules may be different for differing processing systems 202A-202L and not consistent therebetween.

Thus, according to a first embodiment of the present disclosure, the SoC 200 includes channel circuitry 204 coupled to and residing among the plurality of processing systems 202A-202L that includes communication circuitry configured to service communications for the plurality of processing systems and a QoS manager 206. The communication circuitry (detail not shown in FIG. 2 but which structure is known) includes one or more communication buses, routers, bridges, and other data flow and routing components that communicatively intercouple the plurality of processing systems 202A-202L.

The channel circuitry 204 further includes a QoS manager 206 configured to manage the QoS of communications among and between the plurality of processing systems 202A-202L. In its operations, the QoS manager 206 determines that a first processing system, e.g. 202M, of the plurality of processing systems that operates according to first QoS rules desires to send a communication with a first QoS selection of the first QoS rules to a second processing system, e.g., 202J, which operates according to second QoS rules. For example, the QoS manager 206 may determine that the first processing system 202M is to communicate with the second processing system 202J (e.g., a signal or message may be received). As another example, the QoS manager 206 may determine that the first processing system 202M has a communication to send to the second processing system 202J. The QoS manager 206 is further configured to determine available communication receipt resources of the second processing system 202J of the plurality of processing systems, the second processing system 202J supporting second QoS rules. The QoS manager 206 is also configured to determine a communication resource allocation for the second processing system 202J based upon the first QoS rules, the second QoS rules, and the first QoS selection. The QoS manager 206 is further configured to direct the second processing system 202J to operate according to the communication resource allocation to receive the communication from the first processing system.

The SoC of FIG. 2 includes a number of options, which may be combined singularly, fully, or in partial combination. According to a first option, the QoS manager 206 is further configured to determine whether the communication request was successfully completed. According to another option, the first processing system 202M is a Network on a Chip (NoC). Further, the second processing system 202J may be a memory controller.

The communication resource allocation may affect a receive buffer of the second processing system that services a first QoS selection of the second QoS rules. With this option, the QoS manager 206 is configured to direct the second processing system to divide the receive buffer into a first portion to service the first QoS selection of the first QoS rules and a second portion to service a second QoS selection of the first QoS rules. With another option, the QoS manager 206 may be configured to monitor a fill state of the first portion, monitor a fill state of the second portion, and direct the first processing system to transmit data to the second processing system based upon the fill state of the first portion and the fill state of the second portion. Further, the QoS manager 206 may be configured to monitor transmit buffers of the first processing system, determine the first QoS selection QoS level of a communication from the first processing system to the second processing system, and, based upon the determined QoS level, adjust an indicated fill state of a receive buffer of the second processing system. An example of these structures/operations will be described with reference to FIG. 8.

According to a second embodiment of the SoC 200, the QoS manager 206 is configured to monitor available communication receipt resources of a second processing system of the plurality of processing systems, the second processing system supporting second QoS rules. The QoS manager 206 is further configured to determine that a first processing system 202M of the plurality of processing systems that operates according to first QoS rules desires to send a communication with a first QoS selection of the first QoS rules. The QoS manager 206 is further configured to determine a communication resources allocation for the second processing system 202J based upon the available communication receipt resources, the first QoS selection, the first QoS rules, and the second QoS rules and direct the first processing system 202M to transmit the communication to the second processing system 202J according to the communication resources allocation.

The second embodiment may also have a number of options. With a first option, the QoS manager 206 is further configured to determine whether the communication request was successfully completed. With another option, the first processing system 202M is a NoC. With another option, the communication resource allocation affects a receive buffer of the second 202J processing system that services a first QoS selection of the second QoS rules. The QoS manager 206 may be configured to direct the second processing system to divide the receive buffer into a first portion to service the first QoS selection of the first QoS rules and a second portion to service a second QoS selection of the first QoS rules. Further, the QoS manager 206 may be configured to monitor a fill state of the first portion, monitor a fill state of the second portion, and direct the first processing system to transmit data to the second processing system based upon the fill state of the first portion and the fill state of the second portion.

Further, the QoS manager may be configured to monitor transmit buffers of the first processing system, determine the first QoS selection QoS level of a communication from the first processing system to the second processing system, and based upon the determined QoS level, adjust an indicated fill state of a receive buffer of the second processing system.

Figure 3A:
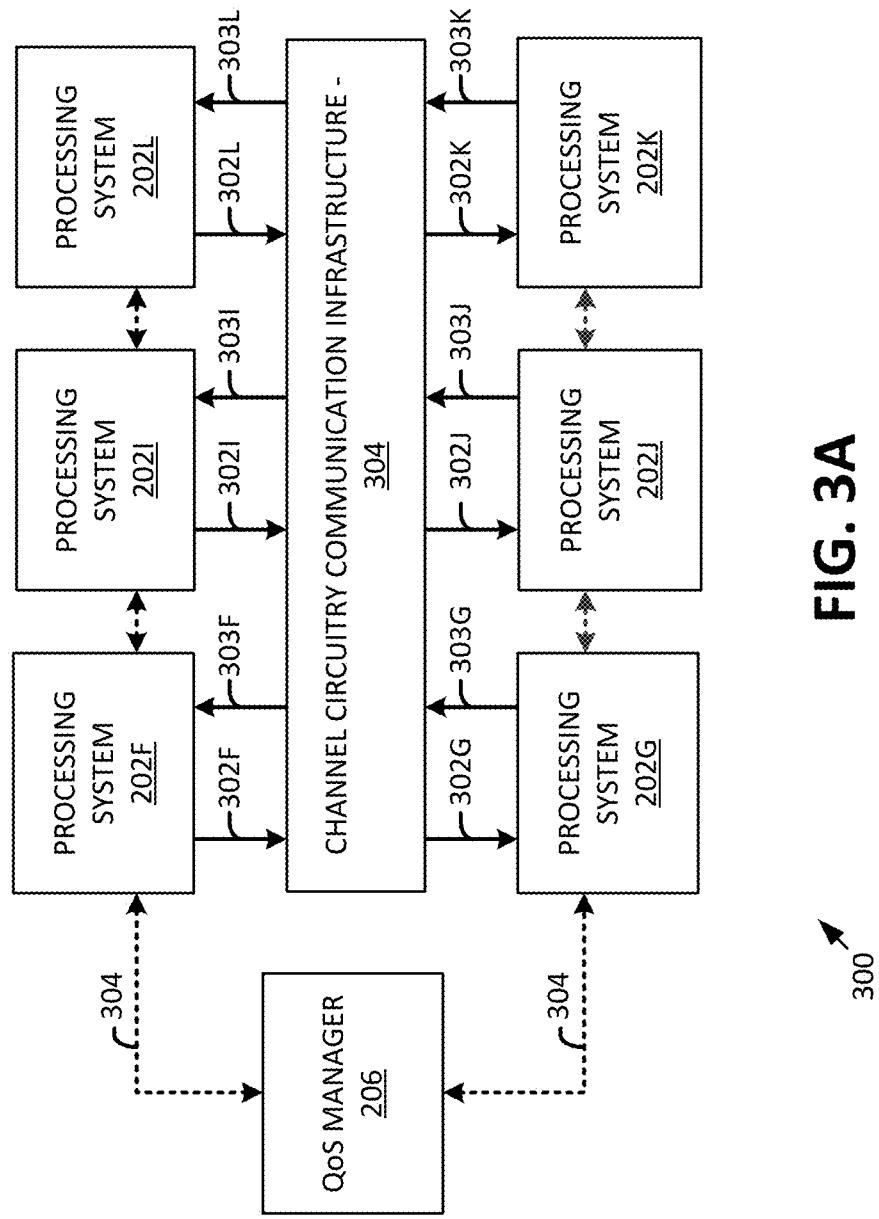
FIG. 3A is a block diagram illustrating a portion of the SoC of FIG. 2 according to a first aspect.

FIG. 3A is a block diagram illustrating a portion of the SoC of FIG. 2 according to a first aspect 300. With this aspect, the channel circuitry 204 includes a channel circuitry communication infrastructure 304, which includes one or more data buses, one or more data switches, one or more data routers, one or more latches, and various other components that service the transfer of data between and among the plurality of processing systems 202A-202M (202F, 202G, 202I, 202J, 202L and 202K shown in FIGS. 3A-3C). With the first aspect 300 of FIG. 3A, the QoS manager 206 resides external to the plurality of processing systems 202A-202M and services bi-directional communications with the plurality of processing systems 202A-202M to monitor the communications requirements (via data paths 304) thereof and to manage the communication resources thereof. Further shown are communication paths 302F, 303F, 302G, 303G, 302I, 303I, 302J, 303J, 302L, 303L, 302K and 303K that service communications among and between the plurality of processing systems 202F, 202G, 202I, 202J, 202L, and 202K. The first aspect 300 of FIG. 3A may operate according to the concepts previously described with reference to FIG. 2 and the concepts that will be described with reference to FIGS. 4-8.

Figure 3B:
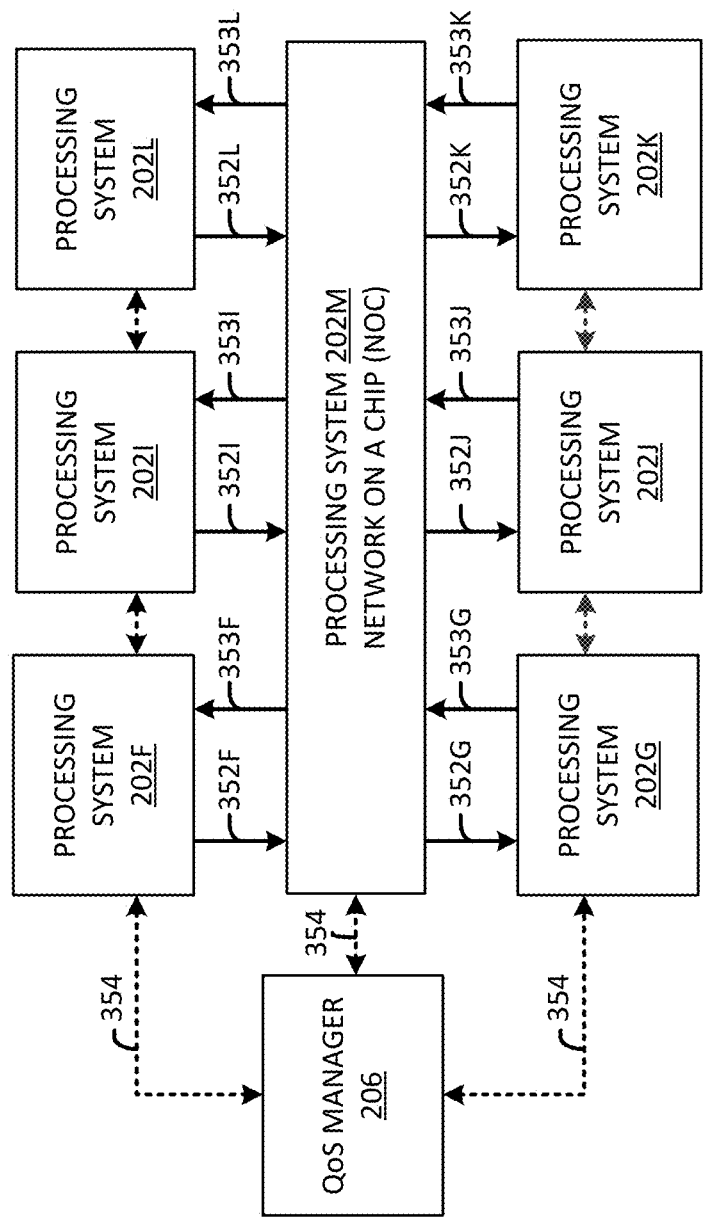
FIG. 3B is a block diagram illustrating a portion of the SoC of FIG. 2 according to a second aspect.

FIG. 3B is a block diagram illustrating a portion of the SoC of FIG. 2 according to a second aspect. With this aspect 350, a network on a chip (NoC) 202M (one of the processing systems) services communications among the plurality of processing systems 202F, 202G, 202I, 202J, 202L and 202K. The second aspect 350 also includes a channel circuitry communication infrastructure, which includes one or more data buses, one or more data switches, one or more data routers, one or more latches, and various other components that service the transfer of data between and among. With second aspect 350 of FIG. 3A, the QoS manager 206 resides external to the plurality of processing systems 202A-202M and services bi-directional communications with the plurality of processing systems 202A-202M to monitor the communications requirements (via data paths 354) thereof and to manage the communication resources thereof. Further shown are communication paths 352F, 353F, 352G, 353G, 352I, 353I, 352J, 353J, 352L, 353L, 352K and 353K that service communications among and between the plurality of processing systems 202F, 202G, 202I, 202J, 202L, and 202K.

As contrasted to the 300 aspect of FIG. 3A, with the aspect 350 of FIG. 3B, the QoS manager cooperates with the NoC 202M to service communications among the plurality of processing systems 202F, 202G, 202I, 202J, 202L, and 202K. The second aspect 350 of FIG. 3B may operate according to the concepts previously described with reference to FIG. 2 and the concepts that will be described with reference to FIGS. 4-8.

Figure 3C:
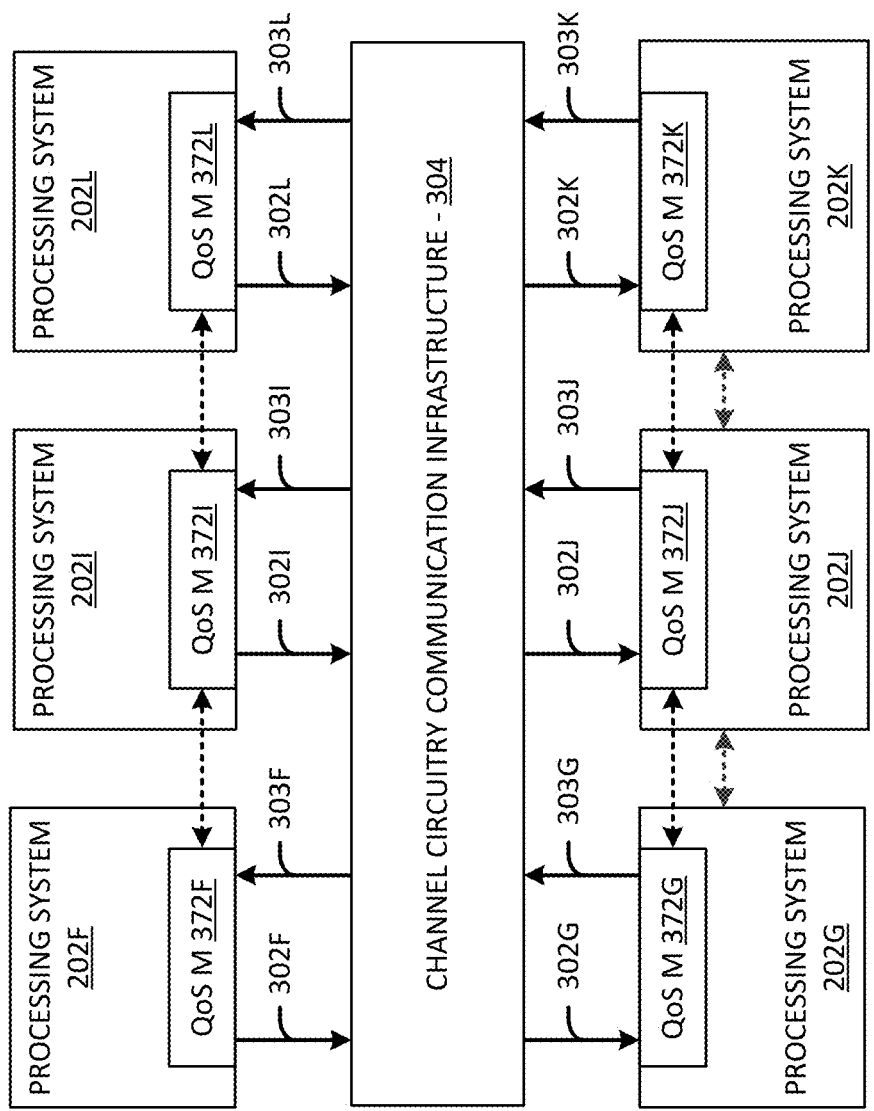
FIG. 3C is a block diagram illustrating a portion of the SoC of FIG. 2 according to a third aspect.

FIG. 3C is a block diagram illustrating a portion of the SoC of FIG. 2 according to a third aspect. With this aspect, the channel circuitry 204 includes channel circuitry communication infrastructure 304, which includes one or more data buses, one or more data switches, one or more data routers, one or more latches, and various other components that service the transfer of data between and among the plurality of processing systems (202F, 202G, 202I, 202J, 202L and 202K shown in FIGS. 3A-3C). With third aspect 370 of FIG. 3C, the QoS manager 206 resides internally to each of the plurality of processing systems 202F, 202G, 202I, 202J, 202L and 202K and services bi-directional communications with the plurality of processing systems 202A-202M to monitor the communications requirements thereof and to manage the communication resources thereof. Further shown are communication paths 302F, 303F, 302G, 303G, 302I, 303I, 302J, 303J, 302L, 303L, 302K and 303K that service communications among and between the plurality of processing systems 202F, 202G, 202I, 202J, 202L, and 202K. The QoS manager 372F, 372G, 372I, 372J, 372L, and 372K is respect to the plurality of processing systems 202F, 202G, 202I, 202J, 202L and 202K and performs the various functions and methods described herein. The third aspect 370 of FIG. 3C may operate according to the concepts previously described with reference to FIG. 2 and the concepts that will be described with reference to FIGS. 4-8.

Figure 4:
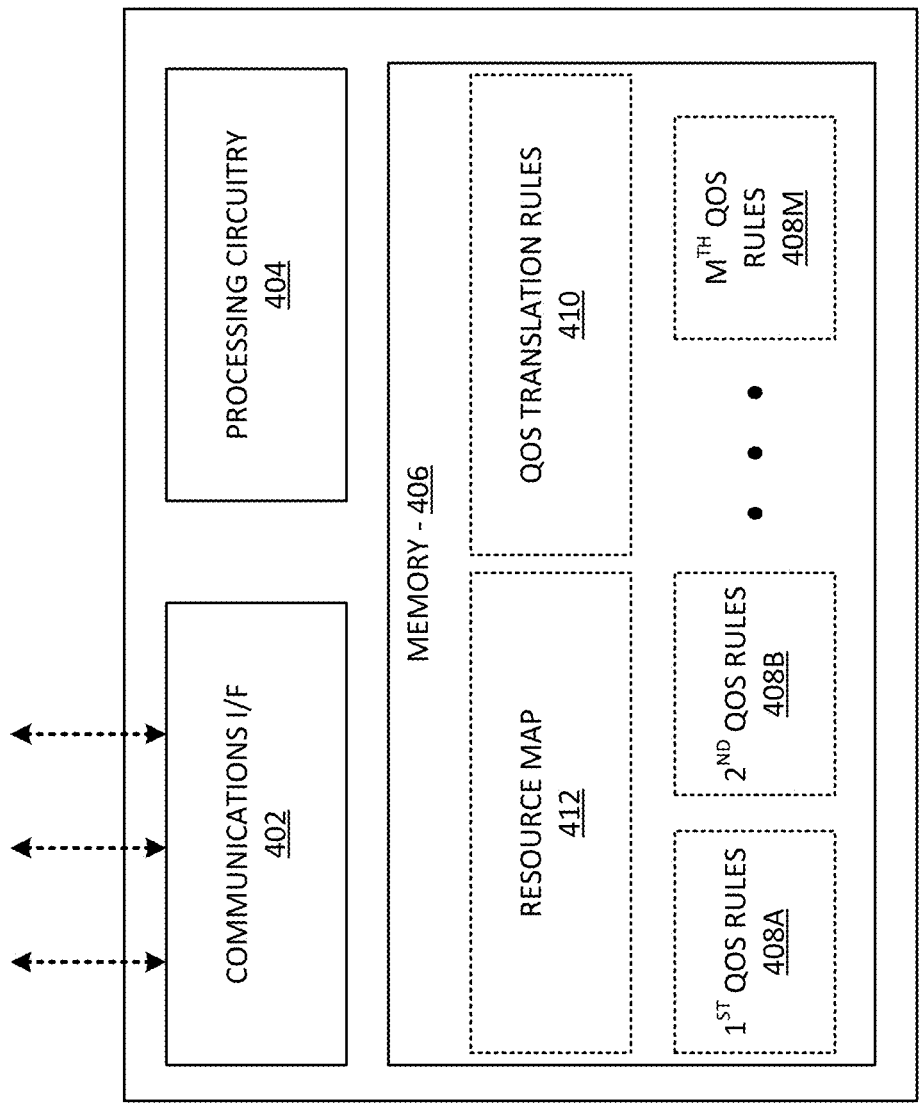
FIG. 4 is a block diagram illustrating a Quality of Service (QoS) manager according to an embodiment of the present disclosure.

FIG. 4 is a block diagram illustrating a Quality of Service (QoS) manager according to an embodiment of the present disclosure. The QoS manager 206 includes a communications I/F 402, processing circuitry 404, and memory 406 that intercouple with one another via communication buses and signal lines. The communications I/F 402 supports wired communications in some embodiments but may support wireless communications in other embodiments. The processing circuitry 404 may be a general-purpose processor, an application specific processor, or other processing circuitry. The memory 406 may be any type of RAM or ROM.

Stored in the memory 406 is a resource map 412 that identifies the available communication resources (and/or other resources) of the serviced plurality of processing systems 202A-202M. This indication may include the status of input buffers, output buffers, and/or communication status of the plurality of processing systems 202A-202M. The memory 406 also stores QoS translation rules for servicing communications between processing systems having differing QoS rules. The memory 406 also stores data relating to the QoS rules 408A-408M of the plurality of processing systems 202A-202M, respectively. The data relating to the QoS rules may be programmed at time of manufacture of the SoC or, alternately, programmed after manufacture. The data may be soft coded or hard coded.

Figure 5:
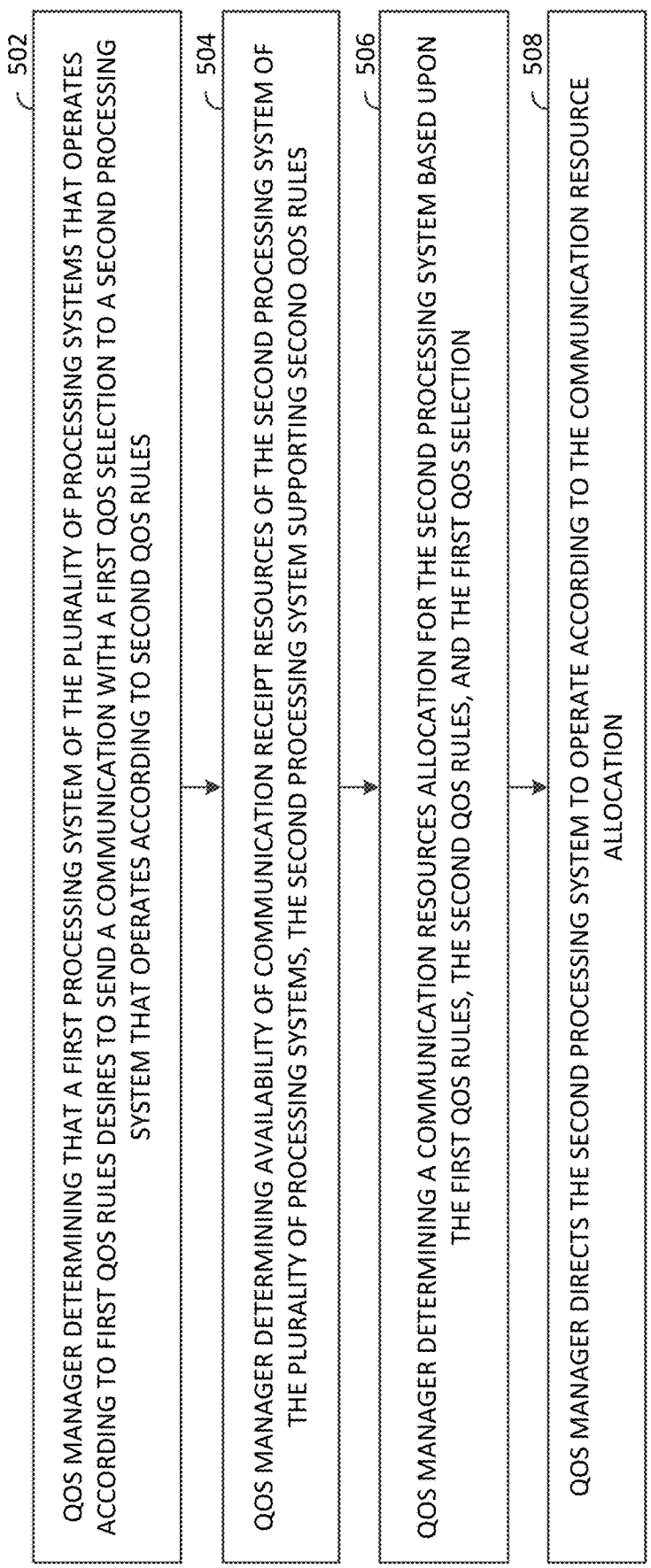
FIG. 5 is a flow chart illustrating operations of the SoC of FIG. 2 according to an embodiment of the present disclosure.

FIG. 5 is a flow chart illustrating operations of the SoC of FIG. 2 according to an embodiment of the present disclosure. The method 500 of FIG. 5 begins with the QoS manager 206 of the SoC 200 determining that a first processing system of the plurality of processing systems that operates according to first QoS rules desires to send a communication with a first QoS selection of the first QoS rules to a second processing system that operates according to second QoS rules (step 502). Operations 500 continue with the QoS manager determining available communication receipt resources of the second processing system of the plurality of processing systems, the second processing system supporting second QoS rules (step 504). Operations 500 further continue with the QoS manager determining a communication resources allocation for the second processing system based upon the first QoS rules, the second QoS rules, and the first QoS selection (step 506). Operations conclude with the QoS manager directing the second processing system to operate according to the communication resource allocation to receive the communication from the first processing system (step 508).

The operations 500 of FIG. 5 may include various options. With a first optional operation, the QoS manager determines whether the communication request was successfully completed. With second optional operation, the QoS manager directs the second processing system to divide its receive buffer into a first portion to service the first QoS selection of the first QoS rules and a second portion to service a second QoS selection of the first QoS rules. This second optional operation may include the QoS manager monitoring a fill state of the first portion, monitoring a fill state of the second portion, and directing the first processing system to transmit data to the second processing system based upon the fill state of the first portion and the fill state of the second portion.

With a third optional operation, the QoS manager monitors transmit buffers of the first processing system, determines the first QoS selection QoS level of a communication from the first processing system to the second processing system, and, based upon the determined QoS level, adjusts an indicated fill state of a receive buffer of the second processing system.

Figure 6:
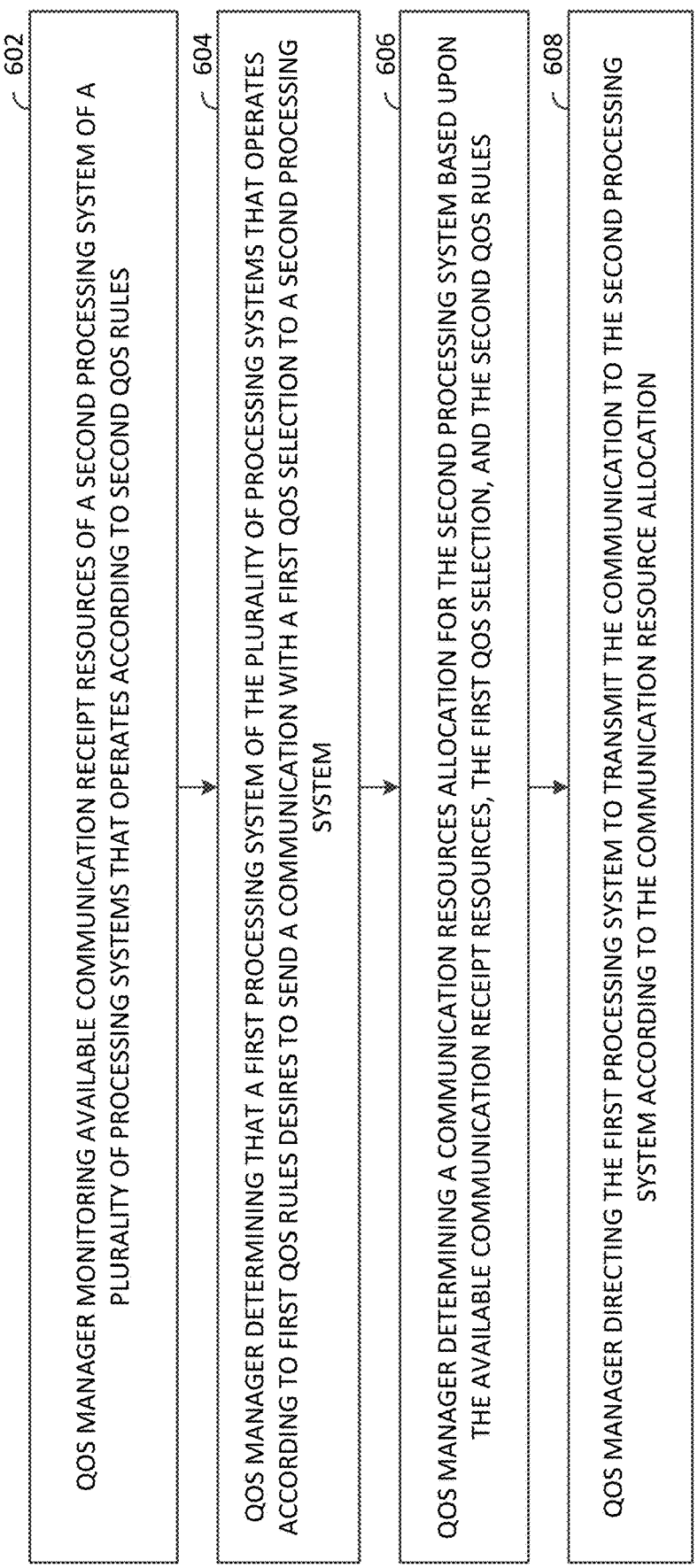
FIG. 6 is a flow chart illustrating operation of the SoC of FIG. 2 according to another embodiment of the present disclosure.

FIG. 6 is a flow chart illustrating operation of the SoC of FIG. 2 according to another embodiment of the present disclosure. The operations 600 of FIG. 6 include a QoS manager monitoring available communication receipt resources of a second processing system of the plurality of processing systems, the second processing system supporting second QoS rules (step 602). The method further includes the QoS manager determining that a first processing system of the plurality of processing systems that operates according to first QoS rules desires to send a communication with a first QoS selection of the first QoS rules (step 604). The operations 600 next includes the QoS manager determining a communication resources allocation for the second processing system based upon the available communication receipt resources, the first QoS selection, the first QoS rules, and the second QoS rules (step 606). The operations 600 finally include the QoS manager directing the first processing system to transmit the communication to the second processing system according to the communication resources allocation (step 608).

The operations of FIG. 6 include a number of optional steps. With one of these optional steps, the QoS manager determines whether the communication request was successfully completed. With another optional step, the communication resource allocation affects a receive buffer of the second processing system that services a first QoS selection of the second QoS rules.

With yet another optional step, the QoS manager may direct the second processing system to divide the receive buffer into a first portion to service the first QoS selection of the first QoS rules and a second portion to service a second QoS selection of the first QoS rules. In such case, the QoS manager may monitor a fill state of the first portion, monitor a fill state of the second portion and direct the first processing system to transmit data to the second processing system based upon the fill state of the first portion and the fill state of the second portion. Further, the QoS manager may monitor transmit buffers of the first processing system, determine the first QoS selection QoS level of a communication from the first processing system to the second processing system, and, based upon the determined QoS level, adjust an indicated fill state of a receive buffer of the second processing system.

Figure 7:
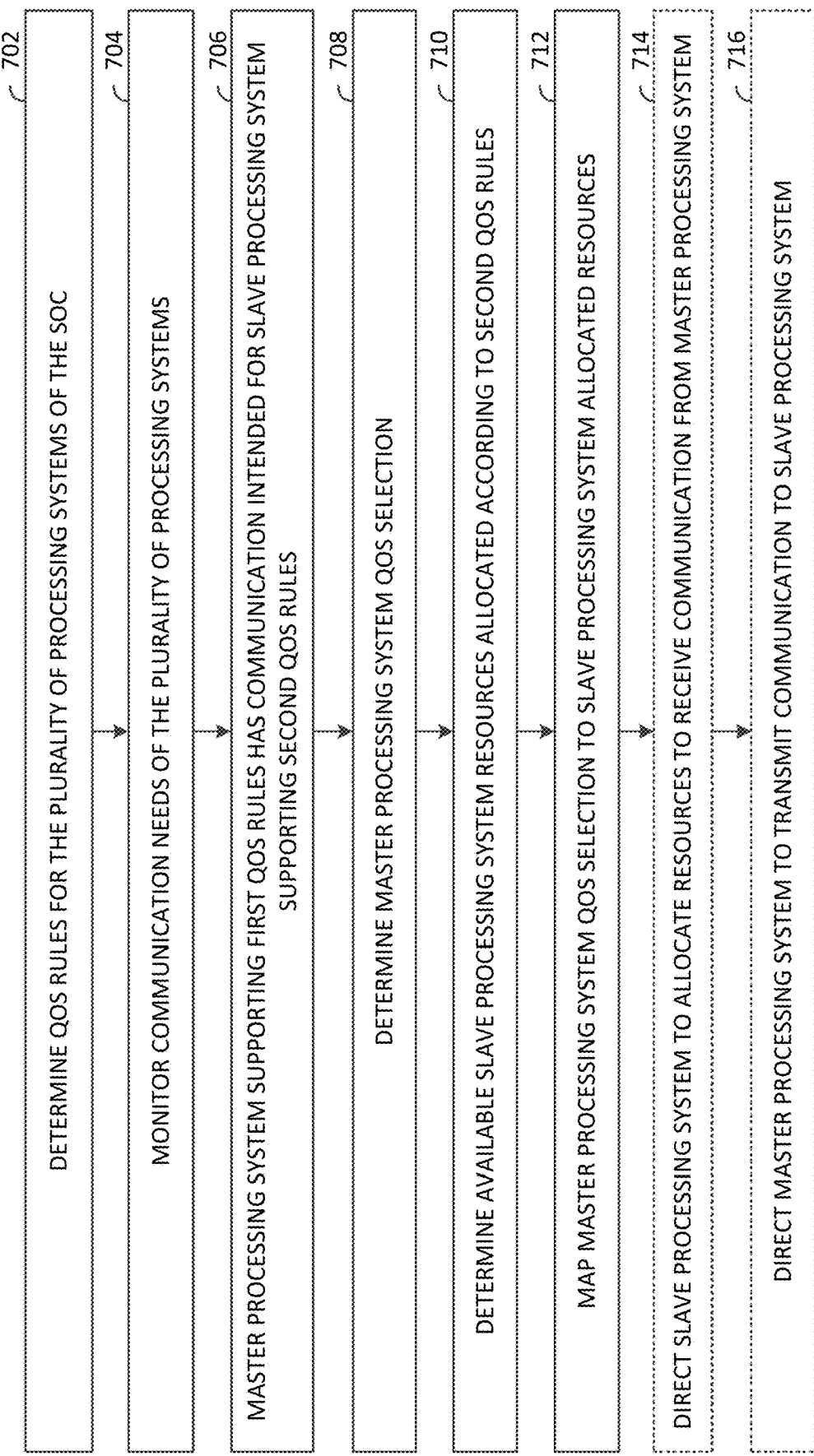
FIG. 7 is a flow chart illustrating operation of the SoC of FIG. 2 according to yet another embodiment of the present disclosure.

FIG. 7 is a flow chart illustrating operations of the SoC of FIG. 2 according to yet another embodiment of the present disclosure. The operations 700 of FIG. 7 consider an overarching view of the operations of the SoC. Operations 700 commence with the QoS manager determining QoS rules for the plurality of processing systems (step 702). Operations 700 continue with QoS manager monitoring the communication needs of the plurality of processing systems (step 704). Operations 700 then include the QoS manager determining that a master processing system that supports first QoS rules has a communication intended for a slave processing system that supports second QoS rules (step 706). The QoS manager then determines the QoS selection of the master processing system for the communication (step 708). Based upon these determinations, the QoS manager determines available slave processing system resources allocated according to second QoS rules supported by the slave processing system (step 710).

The QoS manager then maps the master processing system QoS selection to the slave processing system allocated resources (step 712). Since there is a mismatch between the first QoS rules and the second QoS rules, the QoS manager must map available communication resources of the slave processing system to the communication needs of the master processing system. The QoS manager then optionally directs the slave processing system to allocate resources in preparation for receipt of the communication from the master processing system (step 714). Finally, the QoS manager optionally directs the master processing system to transmit the communication to the slave processing system (step 716). The various operations 700 of FIG. 7 may be performed in a differing order in some embodiments and may include fewer or greater operations in some other embodiments.

Figure 8:
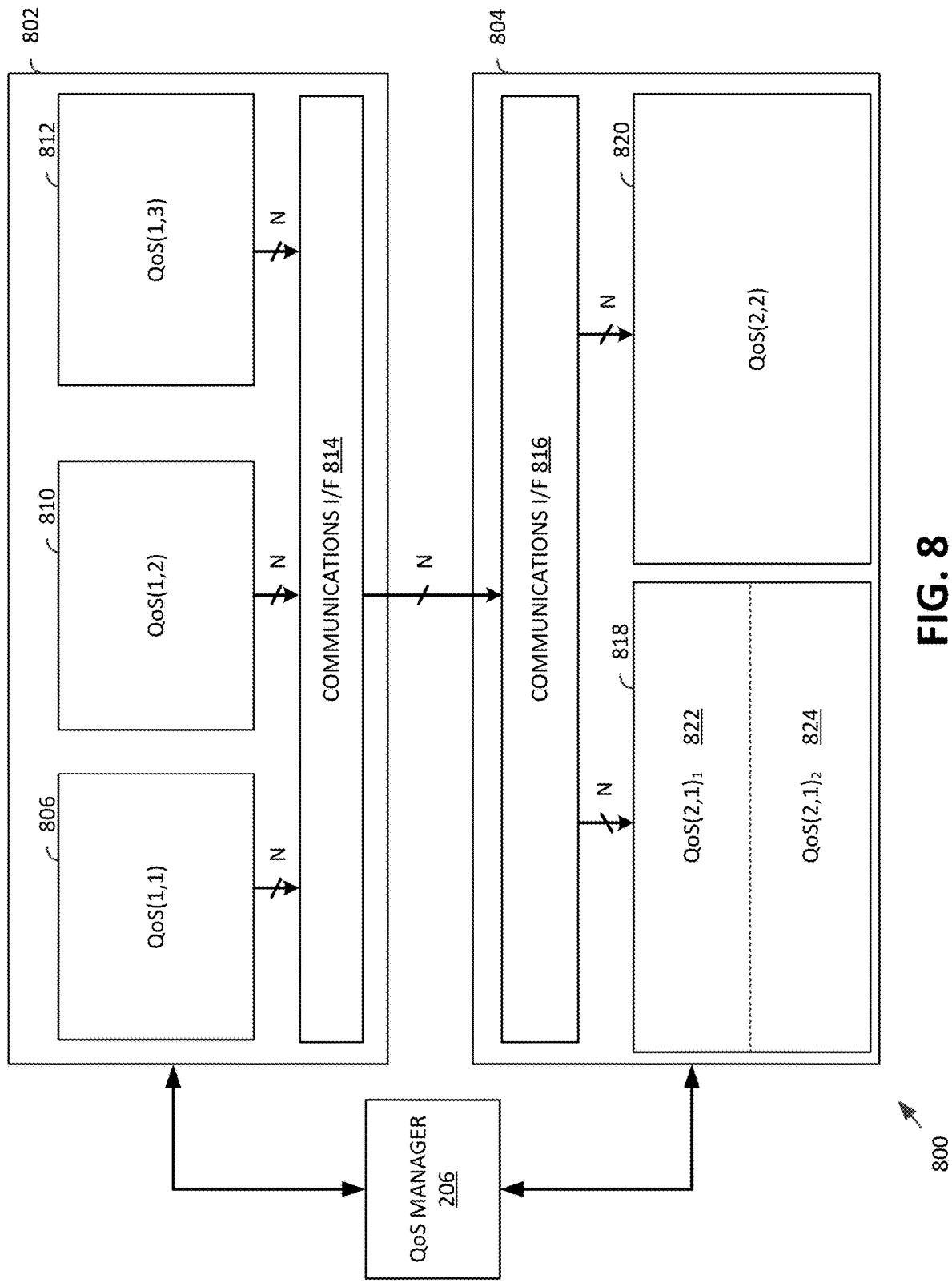
FIG. 8 is a block diagram illustrating a portion of the SoC of FIG. 2 showing the division of buffers to support differing QoS rules and selections.

FIG. 8 is a block diagram illustrating a portion of the SoC of FIG. 2 showing the division of buffers to support differing QoS rules and selections. As was described previously, differing processing systems may support differing QoS rules. In the example of FIG. 8, a first processing system 802 supports first QoS rules with three differing QoS selections. For transmit side operations, the first processing system 802 includes three different transmit buffers, each allocated to a particular QoS selection. For example, transmit buffer 806 is allocated to a first QoS selection of the first QoS rules, transmit buffer 810 is allocated to a second QoS selection of the first QoS rules, and transmit buffer 812 is allocated to a third QoS selection of the first QoS rules. A communications I/F 814 services communications with a communications I/F 816 of a second processing system 804.

The second processing system 804 supports second QoS rules that have two differing QoS selections. A first receive buffer 818 supports a first QoS selection of the second QoS rules while a second receive buffer 820 supports a second QoS selection of the second QoS rules. For transmissions between the first processing system 802 and the second processing system 804 there is a mismatch between transmit buffers 806, 810, and 812 of the first processing system 802 and the receive buffers 818 and 820 of the second processing system. Thus, according to an embodiment of the present disclosure, the QoS manager 206 enacts a communication resource allocation that affects the receive buffer 818 of the second processing system 804. The QoS manager 206 is configured to direct the second processing system to divide the receive buffer 818 into a first portion 822 to service the first QoS selection of the first QoS rules and a second portion 824 to service a second QoS selection of the first QoS rules.

With another option, the QoS manager 206 may be configured to monitor a fill state of the first portion 822, monitor a fill state of the second portion 824, and direct the first processing system 802 to transmit data to the second processing system 804 based upon the fill state of the first portion 822 and the fill state of the second portion 824. Further, the QoS manager 206 may be configured to monitor transmit buffers 806, 810, and 816 of the first processing system 802, determine the first QoS selection QoS level of a communication from the first processing system 802 to the second processing system 804, and, based upon the determined QoS level, adjust an indicated fill state of a receive buffer, e.g., 818, of the second processing system 804.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the teachings herein.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present)

and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted therewith.

What is claimed is:

1. A System on a Chip (SoC) configured for inclusion in a vehicle, the SoC comprising:
    a plurality of processing systems associated with autonomous driving; and
    a QoS manager in communication with the processing systems, wherein the QoS manager is configured to:
    identify that a first processing system of the plurality of processing systems is configured to transmit a communication to a second processing system of the plurality of processing systems, wherein the communication is associated with a first QoS selection of first QoS rules, wherein the first QoS selection is indicative of a selection of a first QoS level of a plurality of QoS levels associated with the first QoS rules, and wherein the QoS levels are associated with different allocations of buffers of the first processing system;
    cause the second processing system to operate according to a communication resources allocation which is determined based upon the first QoS selection, wherein the communication resources allocation indicates translation of the first QoS level between the first QoS rules and second QoS rules used by the second processing system, and wherein the communication resources allocation causes adjustment of at least one buffer of a plurality of buffers of the second processing system,
    wherein the QoS manager is further configured to monitor a transmit buffer of the first processing system and based on the first QoS selection adjust a receive buffer of the second processing system.

2. The SoC of claim 1, wherein the QoS manager is further configured to determine whether the communication request was successfully completed.

3. The SoC of claim 1, wherein the SoC further comprises communication circuitry configured to service communications for the plurality of processing systems.

4. The SoC of claim 1, wherein the plurality of buffers of the second processing system include a receive buffer and a transmit buffer.

5. The SoC of claim 4, wherein the receive buffer is subdivided according to the first QoS rules.

6. The SoC of claim 4, wherein the receive buffer is subdivided into a first portion to service the first QoS selection and a second portion to service a second QoS selection of the first QoS rules.

7. The SoC of claim 1, wherein an indicated fill state of the receive buffer is adjusted.

8. The SoC of claim 1, wherein the QoS manager directs the first processing system to transmit the communication to the second processing system according to the communication resources allocation.

9. The SoC of claim 1, wherein the first processing system is a network on a chip.

10. A method for operating a system on a chip (SoC) including a plurality of processing systems in communication with a Quality of Service (QoS) manager, the processing systems being associated with autonomous driving, the method being implemented by the QoS manager and comprising:
    identifying that a first processing system of the plurality of processing systems has a communication to transmit to a second processing system of the plurality of processing systems, wherein the communication is associated with a first QoS selection of first QoS rules, wherein the first QoS selection is indicative of a selection of a first QoS level of a plurality of QoS levels associated with the first QoS rules, and wherein the QoS levels are associated with different allocations of buffers of the first processing system; and
    causing the second processing system to operate according to a communication resources allocation which is determined based upon the first QoS selection, wherein the communication resources allocation indicates translation of the first QoS level between the first QoS rules and second QoS rules used by the second processing system, and wherein the communication resources allocation causes adjustment of at least one buffer of a plurality of buffers of the second processing system,
    wherein the method further comprises monitoring a transmit buffer of the first processing system and, based on the first QoS selection, adjusting a receive buffer of the second processing system.

11. The method of claim 10, wherein the method further comprises determining whether the communication request was successfully completed.

12. The method of claim 10, wherein the SoC further comprises communication circuitry configured to service communications for the plurality of processing systems.

13. The method of claim 10, wherein the plurality of buffers of the second processing system include a receive buffer and a transmit buffer.

14. The method of claim 13, wherein the receive buffer is subdivided according to the first QoS rules.

15. The method of claim 13, wherein the receive buffer is subdivided into a first portion to service the first QoS selection and a second portion to service a second QoS selection of the first QoS rules.

16. The method of claim 10, wherein an indicated fill state of the receive buffer is adjusted.

17. The method of claim 10, wherein the method further comprises directing the first processing system to transmit the communication to the second processing system according to the communication resources allocation.

18. The method of claim 10, wherein the first processing system is a network on a chip.

* * * * *